AIR BEARING MAGNETIC TRANSDUCER

Original Filed Feb. 2, 1955

INVENTOR
NORMAN J. APPLETON

AIR BEARING MAGNETIC TRANSDUCER

Original Filed Feb. 2, 1955 3 Sheets-Sheet 2

INVENTOR
NORMAN J. APPLETON

AIR BEARING MAGNETIC TRANSDUCER

Original Filed Feb. 2, 1955

INVENTOR
NORMAN J. APPLETON 3,311,902

AIR BEARING MAGNETIC TRANSDUCER

Norman J. Appleton, Rockaway, N.J., assignor to Sperry Rand Corporation, New York, N.Y., a corporation of Delaware Original application Feb. 2, 1955, Ser. No. 485,746. Divided and this application Dec. 21, 1960, Ser. No. 77,434
7 Claims. (Cl. 340—174.1)

This application is a division of application Ser. No. 485,746 filed Feb. 2, 1955.

This invention relates to recording apparatus, and more particularly to magnetic recording apparatus including head mounting means.

The memory or information storage unit is an essential component of the present day high speed electronic computers. The continued development of such computers has required the creation of recording or information storage units capable of delivering and receiving great quantities of information at high speed. In addition information which has been stored must be accessible when desired with a minimum delay period. From a practical point of view the storage device should have a high storage capacity to space ratio, as well as be efficient in operation, inexpensive to manufacture and maintain, and of high operating reliability.

Accordingly a primary object of the invention is to provide a new and improved magnetic head member mounting means.

The invention accomplishes the above object by providing a revolving signal storage body having a plurality of plane record surfaces and a slider block head member with its bearing and signaling surface proximate the record surface.

The revolving signal storage body may be comprised of a plurality of disks, each having a pair of plane record surfaces. The disks are spaced along their axis of rotation so that their intersurfaces form a plurality of interstices. A pair of slider block members are positioned with their signaling surfaces respectively proximate the record inter-surfaces forming one of the interstices.

The member positioning means comprises a pair of member suspending units connected at the end of a member locating arm which are adapted to be received within any one of the interstices. The member suspending units respectively engage the slider block head members for adjusting their inclination and elevation with respect to their proximate record surfaces, while the member locating arm is transversely movable for controlling the trace path of the members over their respective record surfaces.

A carriage unit supports the member locating arm and is positionable along the axis of the rotating record body when the arm is retracted. This allows the locating arm to be situated for transverse movement into any selected one of the interstices.

Control means is provided for positioning the locating arm and the carriage units.

Figure 1:
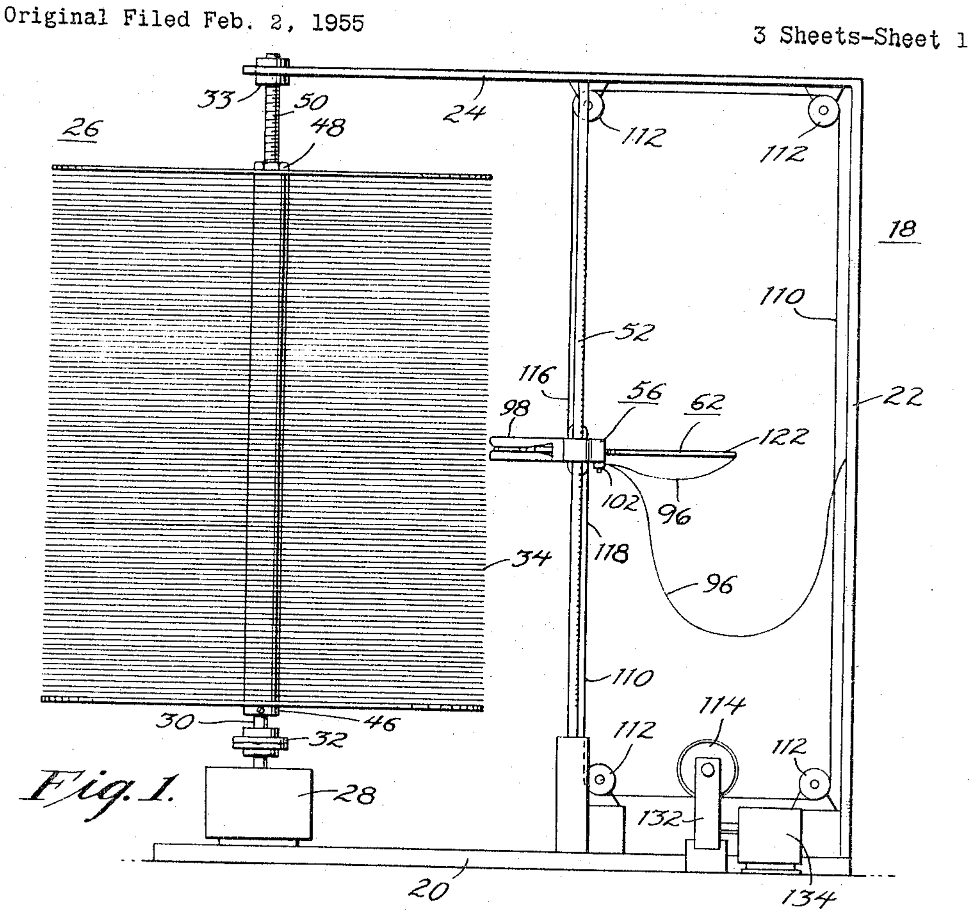
Figure 2:
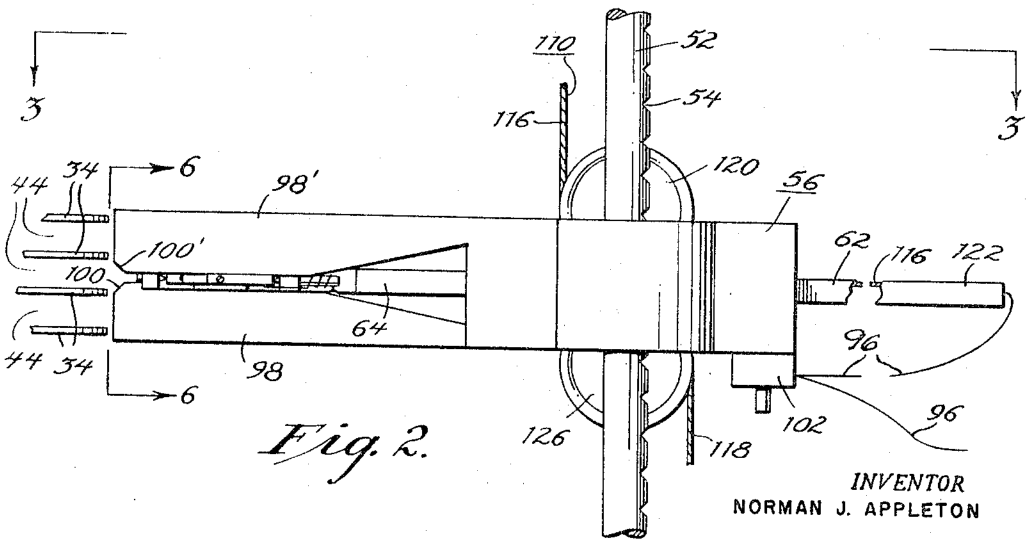
Figures 3, 4, 5, 7:
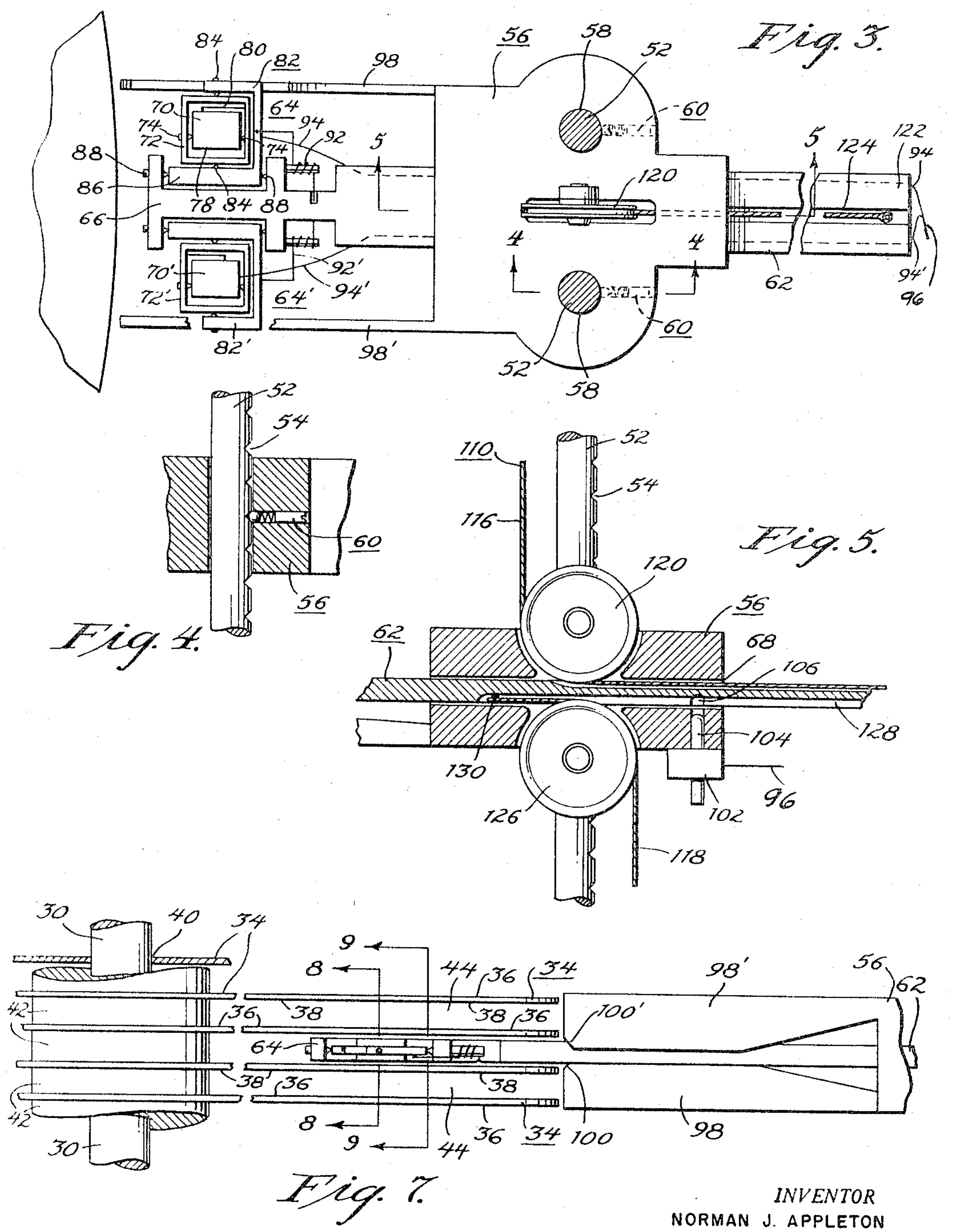
Figure 8:
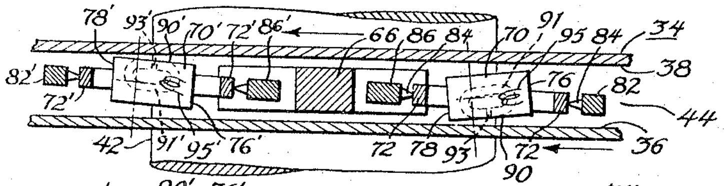
Figure 9:
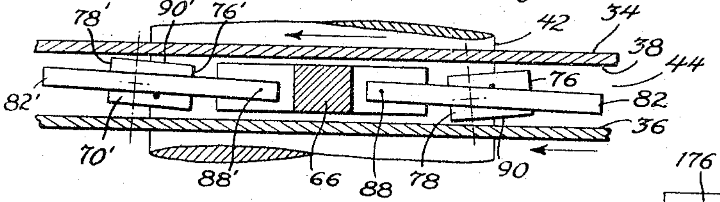
Figure 11:
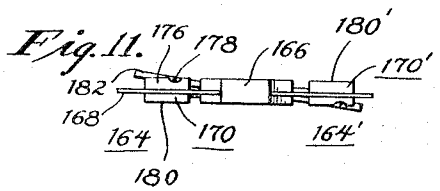
Figure 10:
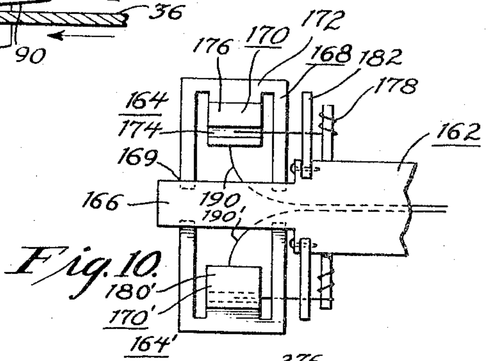
Figure 13:
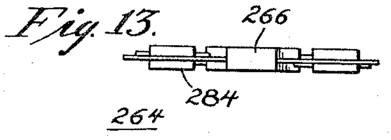
Figure 12:
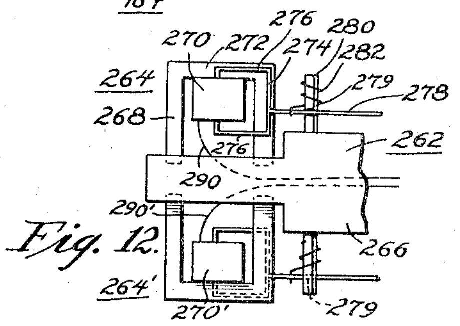
Figures 6, 14, 15:
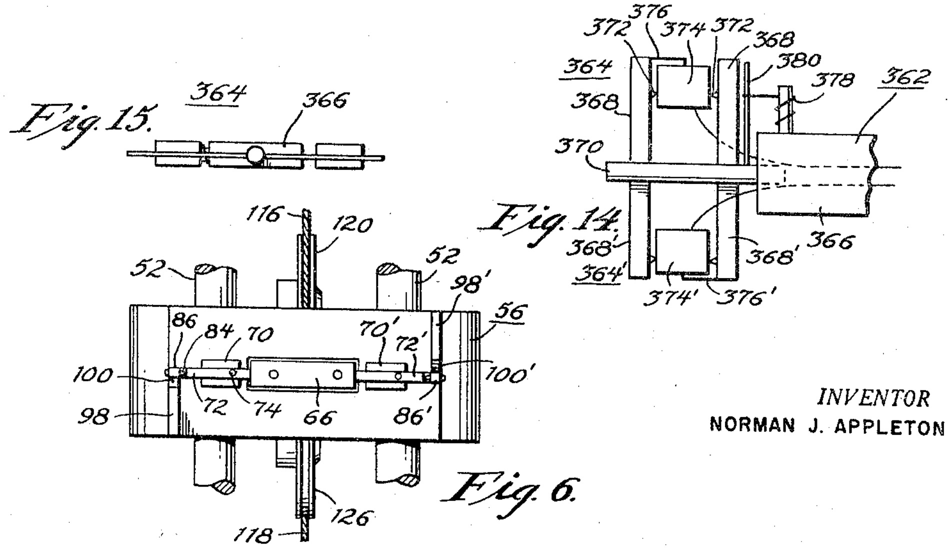

The foregoing and other objects of the invention will become more apparent as the following detailed description of the invention is read in conjunction with the drawings in which:

FIGURE 1 is an elevational view of a recording apparatus embodying the invention, FIGURE 2 is an enlarged elevational view of the carriage unit and the member positioning means in its retracted position as shown in FIGURE 1, FIGURE 3 is a plan view taken on the line 3—3 of FIGURE 2, FIGURE 4 is a fragmentary sectional view taken on the line 4—4 of FIGURE 3 illustrating in detail the carriage unit position retaining mechanism, FIGURE 5 is a sectional view of the carriage unit and a portion of the member locating arm taken on the line 5—5 of FIGURE 3, FIGURE 6 is a side elevational view of the carriage unit and the member positioning means in its retracted position taken on the line 6—6 of FIGURE 2, FIGURE 7 is a view similar to that of FIGURE 2 showing the member positioning means extending into an interstice of the revolving record body, FIGURE 8 is a sectional view taken on the line 8—8 of FIGURE 7 showing in exaggerated form for purposes of illustration the angular and positional relationships between the slider block head members and their proximate record surfaces when positioned by their suspending units and member locating arm within an interstice, FIGURE 9 is a view similar to FIGURE 8 taken on the line 9—9 of FIGURE 7, FIGURE 10 is a plan view of a modified member positioning means utilizing U-shaped resilient leaf elements, FIGURE 11 is a side elevational view of the member positioning means shown in FIGURE 10, FIGURE 12 is another embodiment of the member positioning means utilizing a pair of forked control elements, FIGURE 13 is a side elevational view of the positioning means shown in FIGURE 12, FIGURE 14 is still another modified member positioning means utilizing parallel pairs of resilient leaf elements for pivotally suspending the slider block head members, and FIGURE 15 is a side elevational view of the modified positioning means shown in FIGURE 14.

Refer now to FIGURE 1 in particular which discloses a recording apparatus having a frame structure 18 comprising a base portion 20, a vertical supporting portion 22 and a top portion 24.

A revolving record body 26 is supported by the frame structure 18 and comprises a drive motor 28 resting upon the base portion 20. The output shaft of the motor 28 is connected to the lower end of a rotatable shaft element 30 by a coupling unit 32. The upper end of the shaft element 30 is received through a ball bearing unit 33 mounted on the top portion 24 of the frame structure 18. In this manner the shaft element 30 is positioned for rotation about a vertical axis.

The rotatable shaft element 30 receives along its length a plurality of parallel information storage or record disks 34 each provided with a pair of plane record surfaces 36, 38 and a central opening 40 through which the shaft element 30 is received (FIGURE 7). A plurality of spacer units 42 are also received along the shaft element 30 between adjacent record disks 34. The spacer units 42 uniformly space the intersurfaces 36, 38 of adjacent record disks 34 forming a plurality of respective interstices 44 along the shaft element 30.

A compression ring 46 which is locked with the rotatable shaft element 30 at its lower end supports the record disks 34 and spacer units 42 positioned above it about the shaft element 30. A securing nut 48 threadedly received at the threaded upper end 50 of the shaft element 30 applies a compressive force to the record disks 34 and spacer units 42 clamping them for rotation with the shaft element 30. The spacer units 42 and the disks 34 may also be keyed to the shaft element 30 to insure against slippage.

It is noted that by use of a plurality of recording disks 34 which may be removed from the shaft element 30 and replaced by other disks 34, a recording body 26 of high versatility is achieved. The capacity of the recording body 26 may also be augmented or reduced by adding disks 34 or removing them from the assembly.

In operation the motor 28 drives the rotatable shaft 30 at a constant speed. The recording disks 34 rotate with the shaft 30 about its vertical axis which is also its axis of generation. The recording apparatus utilizes the revolving record body 26 for storing information by magnetic recordation upon the parallel plane record surfaces 36, 38 of the disks 34. The arrangement of the disks 34 of the revolving record body 26 provides a memory or information storage unit which is highly efficient in space utilization and provides a high degree of accessibility to stored information.

A pair of carriage guiding rod elements 52 are positioned parallel with the shaft element 30 having their lower ends connected with the base portion 20 and their upper ends joined to the top portion 24 of the frame structure 18. The rod elements 52 are provided with a plurality of detent notches or stops 54 (FIGURE 2) which are equally spaced along their lengths corresponding to the spacings between the record disks 34 of the record body 26.

Refer to FIGURES 2, 3 and 4 showing in detail a carriage unit 56 which is provided with two openings 58. The openings 58 respectively receive the rod elements 52 for guiding and positioning the carriage unit along the rotatable axis of the record body 26.

The carriage unit 56 may be retained in any one of a plurality of positions, corresponding to the stops 54 along the rod element 52 by a pair of carriage locking devices 60. The locking devices 60 each comprises a spring loaded ball respectively adapted to engage the stops 54 of the rod elements 52. This spring action is sufficient normally to support the carriage unit 56. However, when a sufficient force is applied in the direction along the rod elements 52 the carriage unit 56 will overcome the locking action of the devices 60 and permit relocation of the carriage unit 56.

The carriage unit 56 supports a member positioning means comprising an elongated member locating arm 62 and a pair of member suspending units 64 and 64′ which are attached at the extending end 66 of the arm 62. The carriage unit 56 is provided with a horizontal opening 68 therethrough slidably receiving the locating arm 62 for movement between retracted and extended positions. The locating arm 62 is supported for motion in its extending direction toward the axis of rotation of the record body 26. The carriage unit 56 is also situated by the locating action of its locking devices 60 and the detent stops 54 of the rod elements 52 so that the locating arm 62 with its extending end 66 when in its extended position is received within an interstice 44 formed by the intersurfaces 36, 38 of adjacent record disks 34. It is noted that the motion of the arm 62 in the radial direction towards the axis of rotation of the record body 26 moves transverse to the direction of motion of the plane intersurfaces 36, 38.

When the locating arm 62 is moved to its fully retracted position its extending end 66 is completely withdrawn from the interstice 44. When in its retracted position the arm 62 will not interfere with the relocation of the carriage unit 56 along the rod element 52. In this manner the carriage unit may be positioned or situated so that the arm 62 can be extended into any selected one of the interstices 44 of the record body 26.

The pair of member suspending units 64, 64′ are laterally attached at the extending end 66 of the locating arm 62 for respectively positioning a pair of slider block head members 70, 70′.

The member suspending unit 64 is provided with a first rectangular frame element 72 having a pair of pivots 74. The pivots 74 engage the slider block head member 70 along an axis of rotation between and parallel with the leading edge 76 and the trailing edge 78 of the head member 70 (see FIGURES 3 and 8). More particularly the axis of rotation provided by the pair of pivots 74 is located from the trailing edge 78 a distance of approximately one-third the distance between the leading and trailing edges 76, 78. While this axis of rotation provides angular adjustment in the longitudinal direction between the edges 76, 78 of the slider block head member 70, a pivot control spring element 80 is connected between the frame element 72 and the leading edge 76 of the head member 70 tending to maintain the head member 70 in substantial alignment within the frame element 72. The purpose of the control spring element 80 (see FIGURE 3) is to prevent substantial misalignment of the block head member 70 while still allowing sufficient pivot action for longitudinal adjustment of the member 70. A similar result may be obtained by tightening the pivots 74 thereby increasing the frictional resistance to motion of the member 70 about its axis of longitudinal rotation.

A second J-shaped frame element 82 is provided with a pair of pivots 84 engaging the rectangular frame element 72 along a central axis perpendicular to the pivot axis of the head member 70. Rotation of the rectangular frame element 72 about its axis provides adjustment of the lateral inclination of the head member 70. The pivots 84 may be tightened to produce sufficient resistance to rotation preventing misalignment of the element 72 while yet allowing sufficient movement for adjustment purposes.

The long leg 86 of the frame element 82 extends in the direction of the locating arm 62 and is connected therewith by a pair of pivots 88. The axis of rotation of the frame element 82 is parallel to the axis of rotation of the head member 70 as well as to the direction of sliding motion of the locating arm 62. When the slider block head member 70 is within an interstice 44 of the record body 26, rotation of the frame element 82 about its axis adjusts the elevation of the bearing and signaling surface 90 of the member 70 with its proximate top record surface 36 of the lower disk 34, while rotation of the member 70 about its pivot axis adjusts the longitudinal inclination of its surface 90 with the record surface 36.

A member loading means comprising a spring 92 exerts a force on the J-shaped frame element 82 which urges the bearing surface 90 of the head member 70 in a direction towards its proximate record surface 36.

The member suspending unit 64′ which is laterally positioned with and similar to the unit 64 acts to adjust the elevation and the longitudinal and lateral inclination of the bearing and signaling surface 90′ of the slider block head member 70′ with respect to its proximate bottom record surface 38 of the upper disk 34 when within an interstice 44. The head member 70′ is likewise urged by a member loading spring 92′ towards its proximate record surface 38.

The slider block head members 70, 70′ each have provided within them a plurality of loop elements 91, 91′. Each loop element 91, 91′ provides a magnetic path having a gap 93, 93′ proximate the signaling surfaces 90, 90′ and a respective energizing winding 95, 95′ about it. The loop elements 91, 91′ may be positioned with their gaps laterally arranged across the bearing and signaling surfaces 90, 90′, of the members 70, 70′, for purposes of recording and receiving information concurrently in a plurality of channels. Although the longitudinal position of the transducer elements 91 and 91′ within the transducer blocks 70 and 70′ may be largely a matter of choice, it will be apparent that for good design practice the gaps 93 and 93′ should be located at a stable point nearest the recording surfaces of the disks. A typical location would, of course, be where the gaps 93 and 93′ are at or adjacent the trailing edges of the active surfaces 90 and 90′ of the blocks 70 and 70′. This point of location of the gaps in the active surfaces 90 and 90′ follows from the fact that the blocks 70 and 70′ float at an inclined angle to the recording surfaces of the disks, and thus the trailing edges of the blocks 70 and 70′ are nearest the surfaces of the recording disks. The windings 95, 95′ are connected to pairs of wires which form a flexible cable 94, 94′ which passes from its slider block head members 70, 70′ into the locating arm 62. The cables extend through the locating arm 62 to its other end where it is joined to a cable loop 96 connecting with the stationary frame structure 18 for communicating information signals. The loop 96 allows movement of the locating arm 62 and the carriage unit 56 without interference.

In a signal receiving or recording operation the locating arm 62 is extended into an interstice 44 of the record body 26 while the body 26 is rotating at a constant speed. The spring loaded member suspending units 64, 64′ respectively urge the bearing and signaling surfaces 90, 90′ of their respective slider block head members 70, 70′ in the direction toward their proximate record surfaces 36, 38. Reference only will be made now to the operation of the slider block head member 70, since the member 70′ operates in a similar manner with respect to its proximate record surface 38.

Because of the relative "sliding" motion between the bearing and signaling surface 90 of the head member 70 and its proximate record surface 36, the fluid (atmospheric air in this case) within the interstice 44 passing between these surfaces develops a force which acts through the center of the pivot axis of rotation of the head member 70. This force which is inversely related to the clearance distance between the bearing and record surfaces 90, 36 tends to increase the clearance distance, thereby counteracting the force exerted by the member loading spring 92.

A detailed analysis of slider bearing theory is given in an article by M. Muskat, F. Morgan and M. W. Meres in an article entitled "The Lubrication of Plane Sliders of Finite Width" published in the Journal of Applied Physics of Mar., 1940, pages 208 and 219 inclusive. This article also indicates that the fluid force developed is a function of the longitudinal angle of inclination of the slider block and is related to many other factors. The angle of inclination is also shown to be a function related to the position of the pivot axis between the leading and trailing edges of the slider block.

From the overall practical aspect, the slider block head member 70 was found to operate most satisfactorily for the purposes of a relatively constant predetermined clearance distance, by positioning the pivot axis parallel to and intermediate the leading and trailing edges, a distance from the trailing edge 78 of approximately one-third the distance between the edges 76, 78. This location was not found to maximize the force developed by the fluid, but did maintain optimum operating stability and constant clearance distance under practical operating circumstances.

With the pivot axis of the slider member 70 fixed the block with automatically assume a predetermined longitudinal angle of inclination and clearance distance with the moving record surface 36.

With the other relative factors fixed, a clearance distance between the bearing and signaling surface 90 and the record surface 36 may be determined by adjusting the loading force exerted by the spring 92. The clearance distance between the surfaces 90, 36 which is maintained is the position of equilibrium wherein the fluid force and the loading force are balanced. Because of this, the clearance distance may be set by varying the force exerted by the loading spring 92. Thus, by increasing the force of the spring 92, a new equilibrium position of reduced clearance will be maintained, whereas decreasing the force of spring 92 will increase the clearance distance at which the fluid force is counter balanced. It is also noted, that variation in the fluid viscosity and the relative speed of the surfaces 90, 36 will also influence the equilibrium clearance distance.

Although in this case the "slider" action takes place in a fluid of atmospheric air, fluids having other viscosities may be used, the force developed by the fluid upon the slider block member 70 being directly proportional to its viscosity.

The clearance distance is maintained substantially constant by the resulting unbalanced forces which act upon the slider block head member 70 when it is not in its equilibrium position. These forces tend to accelerate the member 70 towards its equilibrium position. By reducing to a minimum the mass associated with the slider block head member 70, an unbalanced force acting on the member produces an acceleration many times that of gravity which is constantly effective to maintain the predetermined clearance distance between the bearing and signaling surface 90 and the record surface 36.

The many advantages of this means for maintaining a constant clearance distance for tracking in a magnetic recording apparatus operating at high speed will at once be obvious. One of the great advantages is the reliability and the inexpensive construction of the signaling apparatus provided.

The importance of maintaining a constant clearance distance between the recording surface 90 of the head member 70 and the record surface 36 of the disk 34 for the purpose of magnetic recording when high reliability is essential, is also well known. Thus by maintaining a substantially constant clearance this apparatus allows the head member 70 to record magnetic signals in a plurality of channels in a path traced over the surface of the disk 34. In this apparatus a substantially constant clearance is maintained even though the contour of the disk is not perfectly plane due to irregularities in manufacture and assembly, variations in temperature and deformation with time. Greater tolerance is thus allowed by the use of a slider block head member 70 which reduces the cost of manufacturing and it makes the operation of the disclosed signaling apparatus practicable.

Merely for illustration and not for purposes of limitation the record disk 34 may be made of aluminum material which has been plated with a material having good magnetic recording properties such as cobalt nickel alloy. Disks having a diameter of approximately 20 inches and revolving at a speed of 1200 revolutions per minute, with the outer area being used for recording purposes were found satisfactory. The disks used also had a thickness of five-hundredths of an inch, the distance between the inter-surfaces of the interstices 44 being three-sixteenths of an inch.

Still merely for purposes of illustration, the slider block head member 70 having a longitudinal distance of three-eighths of an inch between its leading and trailing edges 76, 78 while being one-half of an inch wide with its axis of rotation one-eighth of an inch from the trailing edge was found to operate very satisfactorily in an air atmosphere. With the mass associated with the slider block head member 70 being about three grams and a force of six ounces being exerted by the member loading spring 92, a clearance distance which was determined to be substantially four ten-thousandths of an inch was maintained between the bearing and signaling surface 90 and the record surface 36. A sufficiently high acceleration was developed by the unbalanced forces tending to maintain the member at its predetermined clearance distance with good stability. The use of this structure allowed recordation and delivery of information signals with high reliability and accuracy.

The efficiency of the recording apparatus is enhanced by the use of the two slider block head members 70, 70′ in side by side relationship, whereby the members may concurrently act on their proximate record surfaces 36, 38 within an interstice 44. This allows them to simultaneously perform recording operations whereby information is delivered to or received from the record body 26.

The leading and trailing edges 76, 78 of the members 70, 70′ are positioned transverse the direction of motion of their proximate record surfaces 36, 38. Thus by extending the locating arm 62 to respective predetermined positions, information may be recorded in concentric paths traced over the intersurfaces 36, 38. This information is then readily accessible by going to the predetermined location for the desired information. Information may also be recorded in a spiral path on each of the intersurfaces by progressively extending the locating arm 62 in the transverse direction during the recording process.

By these means the recording apparatus may store information in concentric loops or in a spiral path as may be determined under particular conditions of operation.

Since the fluid force counteracting the loading force of the springs 92, 92' is no longer present when the locating arm 62 is in its fully retracted position, a pair of cams 98, 98' extending from the carriage unit 56 are provided for respectively engaging the J-shaped frame elements 82, 82' of the member suspending units 64, 64'.

In the absence of the cams 98, 98' the force of the loading springs 92, 92' upon the suspending units 64 would result in misalignment of the head members 70, 70'. In addition to possible damage to the suspending units 64, 64' and the head members 70, 70', serious difficulty also would be encountered under such circumstances when the locating arm is extended for entrance into a selected interstice 44.

The cams 98, 98' provide the necessary guiding action during the transitional period between static and dynamic action of the slider block head members 70, 70'. The tapered or sloped end 100 of the cam 98 acts to gradually lower the bearing surface 90 of the member 70 towards the record surface 36 approaching the predetermined clearance distance as the full fluid force is developed supporting the member 70 against the loading force. The tapered portion 100' of the cam 98' serves a similar purpose with respect to its slider block head member 70'.

The carriage unit 56 is also provided with an arm locking solenoid 102 (see FIGURE 5) having a movable key 104 which is normally urged in the direction for engaging the opening 106 in the locating arm 62. In operation when the locating arm 62 is in its fully retracted position, its opening 106 is in alignment with the key 104 of solenoid 102. The key 104 being normally urged in the direction towards the arm 62, may at this time enter the opening 106, locking the arm 62 in its retracted position. The arm 62 can be released for transverse sliding action within the carriage unit 56, by energizing the solenoid 102 causing it to withdraw the key 104 as shown in FIGURE 5. The solenoid 102 is connected to a source of energy by the cable loop 96 which returns to the frame structure 18.

In addition to the safety feature provided by locking the arm 62 in its retracted position preparatory to moving the carriage unit 56 along the rod element 52, in view of the following description it will become evident that relocation of the carriage unit 56 can only take place after the arm 62 has been locked in its retracted position.

The movement and positioning of both the locating arm 62 and the carriage unit 56 are provided by a flexible control cable 110 (FIGURE 1). The control cable 110 forms a loop which passes about the four guide wheels 112 which are connected with the frame structure 18, makes several loops about a cable driving drum 114, and has its ends 116, 118 connected respectively at opposite ends of the locating arm 62. The cable end 116 passes downwardly along the guide rod 52, passes around the top guide wheel 120 which is connected with the carriage unit 56, and moves horizontally along the locating arm 62 being attached at the remote end 122 of the arm 62. The arm 62 is also provided with a longitudinal groove 124 which receives within it the cable end 116, clearly shown in FIGURES 3 and 5.

In a similar manner the control cable end 118 passes upwardly along the guide rods 52 to the carriage unit 56, where it passes about a lower guide wheel 126 which is also connected with the carriage unit 56. The cable end 118 then is received within a groove 128 in the bottom surface of the arm 62 and passes in the direction towards the extended end of the arm 62 to a point of attachment 130 (see FIGURE 5).

In operation, the drum 114 is driven in either the clockwise or counter clockwise direction by means of a gear reduction unit 132 which is energized by a reversible drive motor 134. If the drum 114 is driven in the clockwise direction, the control cable 110 will also move in this direction. This will cause the end 116 of the cable 110 to exert a force on the arm 62 causing it to move towards its extended position when it is not locked in its retracted position. The end 118 at the same time will pass about the lower pulley wheel 126 allowing and controlling the extending motion of the locating arm 62.

In a similar manner the counter clockwise rotation of the drum 114 imparts a like motion to the control cable 110. The control cable 110 now acts upon the locating arm 62 moving it towards its retracted position.

By such operations the position and movement of the locating arm 62 is accurately controlled by the control cable 110 which responds to control energization of the reversible motor 134. This provides an accurate means for controlling the trace path of the slider block members 70, 70' with respect to the plane record surfaces 36, 38 within an interstice 44 of the revolving record body 26. The head members 70, 70' may be positioned for recording information at any desired location, and may be returned to any such location to receive the information previously stored.

After information has been stored or received at the intersurfaces of a selected interstice 44, the locating arm 62 may be retracted to its locked position preparatory to relocating the carriage unit 56, by actuating the control cable 110 in the counter clockwise direction.

With the arm 62 locked in its retracted position by the action of the solenoid 102, further motion of the control cable 110 will cause the carriage unit 56 to move along the guide rods 52. The carriage unit 56 will not be moved along the guide rods 52 unless the locating arm 62 is in its retracted locked position because of the retaining action of the carriage locking devices 60. When the positioning arm 62 is locked, however, the retaining action of the locking device 60 can be overcome by force which is now exerted on the carriage unit 56 by the control cable 110.

By rotating the drum 114 in its clockwise direction the carriage unit 56 will move upwardly along the guide rods 52, and will move downwardly when the motor 134 reverses the movement of the control cable 110. In this manner the carriage unit 56 may be situated in a corresponding retaining position for extending the arm 62 into any selected one of the interstices 44 of the revolving record body 26. When so positioned energization of the solenoid 102 will unlock the locating arm 62 allowing it to move towards its extended position into the selected interstice 44 upon the clockwise motion of the control cable 110. Subsequent movement of the control cable 110 will serve to accurately position and move the arm 62, while the carriage unit 56 is maintained in its set position by the locking devices 60. The locating arm 62 may then again be locked in its retracted position when a new carriage location is to be assumed.

The advantages and safety features of the control system and its inherent efficiency because of its alternate control of the positioning arm 62 and the carriage unit 56 are noted. It also provides a control means whereby information stored in predetermined locations is made readily available in a high speed recording apparatus with a minimum of access time expended.

Refer now to FIGURES 10 and 11 which show a locating arm 162 with a modified extending end 166 and member suspending units 164, 164'.

The member suspending unit 164 is comprised of a flexible and resilient substantially U-shaped leaf element 168 having its leg ends 169 connected to and radially extending from the end 166 of the arm 162. The central portion 172 of the leaf element 168 supports a block head member 170, which is provided with a lateral groove 174 in its distal surfaces 176. The groove 174 which is parallel to the leading and trailing edges of the member 170 is located intermediate these edges.

The end of a loading spring 178 contacts the member 170 at the center of its groove 174 urging the bearing and signaling surface 180 (FIGURE 11) towards its proximate record surface when within an interstice 44 of the rotating record body 26. The flexibility of the resilient leaf element 168 allows the member 170 to adjust its elevation and angular inclination both laterally and longitudinally with respect to its proximate record surface.

The end portion of the loading spring 178 passes through an opening in a pivoted rod 182. The rod 182 may be engaged by a cam of its carriage unit when the arm 162 is retracted. In this manner the force exerted by the end of the spring 178 is removed from the head member 170 when it is withdrawn from an interstice of the rotating record body 26. The leaf element 168 then operates to maintain the alignment of the member 170 for insertion within a selected interstice, after which the rod 182 is disengaged and the force of the loading spring 178 is again applied to the head member 170.

The member suspending unit 164' and its slider block head member 170' are similar in construction and operation to those just described. The member 170' however, has its signaling surface 180' adapted for positioning proximate a record surface 38 of the disks 34.

The slider block head members 170, 170' are also respectively provided with signal cables 190, 190' which are received through the locating arm 162.

Refer now to FIGURES 12 and 13 which show another type of member suspending unit 264 which is similar to suspending unit 164 except for the means of applying the loading force to the slider block head member.

The unit 264 comprises a U-shaped resilient and flexible leaf element 268 which supports its slider block head member 270 at its central portion 272. The member loading force is applied to the member 270 by a Y-shaped or forked control element 274 having leg portions 276 and a stem portion 278. The ends of the leg portion 276 pivotally engage the leading and trailing edges of the member 270 about a central longitudinal axis providing adjustment of lateral inclination. The stem portion 278 of the forked element 274 is positioned along an axis which lies intermediate and parallel with the leading and trailing edges of the slider block head member 270. This axis which is positioned intermediate the leading and trailing edges of the member 270, allows rotation for adjusting the longitudinal inclination of the member 270. The stem portion 278 is received within a groove 279 in a stud 280 about which it pivots under the force of the member loading spring 282 for adjusting the elevation of the signaling surface 284 (FIGURE 13) of the member 270.

The extending end of the stem portion 278 of the forked element 274 may be engaged by a cam when the locating arm 262 is retracted for the purpose of counterbalancing the force of the loading spring 282.

The member suspending unit 264' and its slider block head member 270' are similar to those just described. The members 270, 270' are laterally positioned and respectively adapted for recording on and receiving information from their proximate record surface. The cables 290, 290' are provided for communicating with their respective head members 270, 270'.

Refer to FIGURES 14 and 15 which illustrate another modified form of a member suspending unit 364 which is supported at the extending end 366 of a locating arm 362. A second suspending unit 364' is laterally positioned with the unit 364 and similar thereto.

The member suspending unit 364 comprises a parallel pair of resilient and flexible leaf elements 368 which have their ends connected to and radially extending from a rotatable shaft 370. The leaf elements 368 are provided with a pair of pivots 372 which engage a slider block head member 374 along an axis intermediate and parallel to its leading and trailing edges. The deflection of the resilient leaf element 368 provides for the adjustment of a lateral inclination of the head member 374, while its pivotal action allows for the adjustment of the longitudinal inclination of the head member 374.

A pivot control spring 376 which is positioned between the end of one of the leaf elements 368 and the leading edge of the head member 374 maintains the longitudinal inclination of the slider block head member 374 within a desired range. In this manner the slider block head member 376 is maintained in a substantially aligned position even when the member is withdrawn from an interstice 44 of the rotating record body 26.

A clockwise torque force is exerted upon the rotatable shaft 370 by the end of a member loading spring 378 acting on a lever 380 which extends from the shaft 370. This torque force is transmitted by the parallel lead elements 368 and 368' respectively of the suspending units 364, 364' urging the bearing surfaces of their associated head members 374 and 374' towards their respective record surfaces when within an interstice 44 of the body 26.

When the locating arm 362 is withdrawn from an interstice 44 of the body 26, a cam may be provided adapted to engage the lever 380 for counter-balancing the force of the member loading spring 378. It is noted that a great advantage of the torque loading means provided by the locating arm 362 and the suspending units 364, 364' is that it results in a greatly simplified structure. Such a structure also tends to minimize the mass associated with the slider block head members 374, 374'.

It will be obvious to those skilled in the art that the invention may find wide application with appropriate modification to meet the various design circumstances but without substantial departure from the essence of the invention.

What is claimed is:

1. In a magnetic recording apparatus, a slider block head member carrying a magnetic transducer and having a leading edge and a trailing edge, said member being adapted for use with a body having a moving record surface that tends to move a layer of ambient fluid, and head member positioning means including pivot bearing means coupling said head member positioning means to said head member to allow pivoting of said head member about an axis intermediate and parallel with its leading and trailing edges for adjusting the inclination of said member with the record surface of said body simultaneously to allow the force of said fluid to displace said member from said surface, said axis being positioned from the trailing edge approximately one-third of the distance between the leading and trailing edges of said member, said head member positioning means including a frame element surrounding said head member and carrying said pivot bearing means, said head positioning means further including a control spring element attached to said frame element and adapted to engage the leading edge of said head member to hold same in substantial alignment with said frame element.

2. A recording apparatus comprising a body provided with a record surface; a slider block head member having a leading edge, a trailing edge and a bearing and signaling surface proximate a portion of the record surface of said body; said head member and said body being relatively movable whereby the relative motion causes a fluid force to be exerted on the bearing surface of said head member in manner to maintain said head member displaced from said body; and suspension means yieldably supporting said head member in proximate relation with the record surface of said body; said suspension means comprising first, second and third frame elements nested together to form a gimbal mounting structure for the head member, said first frame element pivotally engaging said member on an axis parallel with its leading and trailing edges for adjusting the inclination of said member with the record surface of said body, said axis being positioned closer to the trailing edge of said member, said second frame element pivotally engaging the first frame element along an axis perpendicular to the pivotal axis of said member for adjusting the lateral inclination of said member, said third frame element pivotally engaging said second frame element along an axis perpendicular to the lateral pivot axis of said first frame element for adjusting the elevation of said member with the record surface of said body, a pivot control spring element connected between said member and said first frame element and a member loading means exerting a force through the center of the member pivot axis urging said member in a direction towards said record surface to thereby counteract the fluid force exerted on said head member and maintain a certain spacing between said head member and said record surface.

3. In a recording apparatus; a slider block head member with a leading edge and a trailing edge adapted for use with a body having a moving record surface carrying with it a layer of fluid; member positioning means comprising first, second and third frame elements, first pivot bearing means coupling said first frame element to said member on a pivot axis parallel with its leading and trailing edges for adjusting the inclination of said member with the record surface of said body in response to the force of said fluid on said member; said axis being positioned closer to the trailing edge than to the leading edge of said member; second pivot bearing means coupling said second frame element to the first frame element along an axis perpendicular to the pivotal axis of said member for adjusting the lateral inclination of said member; a third pivot bearing means coupling said third frame element to said second frame element along an axis perpendicular to the lateral pivot axis of said first frame element for adjusting the elevation of said member with the record surface of said body.

4. The apparatus of claim 3 wherein there is further included, a member loading spring carried by said third frame element exerting a force through the center of the member pivot axis urging said member in the direction towards said record surface thereby opposing the force of said fluid.

5. In combination, a slider block head member having leading and trailing edges, a support structure for said head member adapted to permit said head to float over a moving recording surface, said support structure comprising (1) a first yoke member at least partially surrounding the perimeter of said head member and pivotally engaging said head member along an axis parallel to the leading and trailing edges thereof, and (2) a second yoke member at least partially surrounding said first yoke member and pivotally engaging said first yoke member along an axis at right angles to said first-mentioned axis.

6. The structure of claim 5 wherein there is further included in the support structure an arm which pivotally engages said second yoke member along an axis parallel to the first-mentioned axis.

7. The structure of claim 5 wherein the pivotal engagements recited therein are through pivot bearings.

References Cited by the Examiner

UNITED STATES PATENTS 2,862,781 12/1958 Baumeister -------- 340—174.1

BERNARD KONICK, *Primary Examiner.*

IRVING L. SRAGOW, A. I. NEUSTADT, N. N. KUNITZ, R. A. CAHILL, F. C. WEISS, R. M. JENNINGS, *Assistant Examiners.*